(12) United States Patent
Kim et al.

(10) Patent No.: US 8,351,187 B2
(45) Date of Patent: Jan. 8, 2013

(54) SOLID CAPACITOR

(75) Inventors: Jae Kwang Kim, Gyunggi-do (KR);
Kwan Hyeong Kim, Gyunggi-do (KR);
Chong Hoon Pak, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 417 days.

(21) Appl. No.: 12/547,067

(22) Filed: Aug. 25, 2009

(65) Prior Publication Data

US 2010/0226072 A1    Sep. 9, 2010

(30) Foreign Application Priority Data

Mar. 9, 2009    (KR) .................. 10-2009-0019805

(51) Int. Cl.
*H01G 4/00* (2006.01)

(52) U.S. Cl. ........ 361/538; 361/311; 361/303; 361/540; 361/523; 361/525

(58) Field of Classification Search .................. 361/540, 361/523, 311, 303, 533
See application file for complete search history.

(56) References Cited

U.S. PATENT DOCUMENTS

| 7,161,797 | B2 * | 1/2007 | Vaisman et al. ............. 361/540 |
| 2005/0162816 | A1 | 7/2005 | Fujii et al. |
| 2006/0221553 | A1 | 10/2006 | Ihara |
| 2006/0262489 | A1 | 11/2006 | Vaisman et al. |
| 2006/0270115 | A1 | 11/2006 | Sano et al. |

FOREIGN PATENT DOCUMENTS

| CN | 1649052 A | 8/2005 |
| CN | 1841605 A | 10/2006 |
| JP | 06-132175 | 5/1994 |
| JP | 10-144575 A | 5/1998 |
| JP | 2001-110676 A | 4/2001 |
| JP | 2002-110461 | 4/2002 |
| JP | 2004-228424 | 8/2004 |
| KR | 10-2004-0068471 | 7/2004 |

OTHER PUBLICATIONS

Chinese Office Action, with English translation, issued in Chinese Patent Application No. 200910173083.3, dated Nov. 3, 2011.
Korean Office Action, with English Translation, issued in Korean Patent Application No. 10-2009-0019805, dated Nov. 17, 2010.
Chinese Office Action, with English translation, issued in Chinese Patent Application No. 200910173083.3, mailed Jun. 8, 2011.
Japanese Office Action, and English translation thereof, issued in Japanese Patent Application No. 2009-206446 dated Jun. 5, 2012.

* cited by examiner

*Primary Examiner* — Nguyen T Ha
*Assistant Examiner* — Hung Dang
(74) *Attorney, Agent, or Firm* — McDermott Will & Emery LLP

(57) ABSTRACT

A solid capacitor according to an aspect of the invention may include: a capacitor device having an anode lead wire extending from one side thereof; a case molding the capacitor device and exposing the anode lead wire to the outside thereof; cathode and anode lead frames exposed on the outside the case and electrically connected to the capacitor device; a reinforcement interposed in the case between the anode lead wire and the anode lead frame so as to support the capacitor device and electrically connecting the anode lead wire and the anode lead frame; and a resin shielding part applied to the exposed portion of the anode lead wire to prevent the infiltration of foreign substances through the anode lead wire.

7 Claims, 6 Drawing Sheets

SOLID CAPACITOR

CROSS-REFERENCE TO RELATED APPLICATIONS

This application claims the priority of Korean Patent Application No. 2009-0019805 filed on Mar. 9, 2009, in the Korean Intellectual Property Office, the disclosure of which is incorporated herein by reference.

BACKGROUND OF THE INVENTION

1. Field of the Invention

The present invention relates to a solid capacitor, and more particularly, to a solid capacitor that can improve moisture resistance using an anode lead wire exposed on the outside of a case to prevent moisture penetration.

2. Description of the Related Art

In general, a solid capacitor is an electronic component that accumulates electricity or interrupts a direct current and passes an alternating current. Since an element within a solid capacitor is generally formed of tantalum, a solid capacitor is referred to as a tantalum capacitor.

This solid chip capacitor is broadly utilized in circuits with poor frequency characteristics. Also, the solid chip capacitor is generally used for noise reduction in mobile communications terminals.

This solid capacitor is provided as a surface mount chip so as to be used in miniaturized electronic devices, and includes a capacitor device, an anode lead frame coupled with the anode lead wire of the capacitor device, and a cathode lead frame connecting to the capacitor device through a conductive adhesive.

Recently, research into solid capacitors has been undertaken for the purpose of miniaturization and high performance. To this end, the capacitance of a capacitor device within a case has been increased, and the length of the anode lead wire of the capacitor device has been reduced.

Therefore, a capacitor device of a solid capacitor having an anode lead wire having a small length and exposed on the outside of the case is prone to moisture penetration, which leads to a deterioration in product quality.

SUMMARY OF THE INVENTION

An aspect of the present invention provides a solid capacitor that can prevent moisture penetration through an anode lead wire exposed on the outside of the case of the capacitor.

Another aspect of the present invention provides a method of manufacturing a solid capacitor that can increase the volumetric efficiency of the solid capacitor and prevent moisture penetration through an anode lead wire.

According to an aspect of the present invention, there is provided a solid capacitor including: a capacitor device having an anode lead wire extending from one side thereof; a case molding the capacitor device and exposing the anode lead wire to the outside thereof; cathode and anode lead frames exposed on the outside of the case and electrically connected to the capacitor device; a reinforcement interposed in the case between the anode lead wire and the anode lead frame so as to support the capacitor device and electrically connecting the anode lead wire and the anode lead frame; and a resin shielding part applied onto the exposed portion of the anode lead wire to prevent the infiltration of foreign substances through which the anode lead wire.

The cathode lead frame may be electrically connected to the capacitor device through a conductive paste.

The conductive paste may be any one of Ag, Au, Pd, Ni and Cu having viscosity.

A molding material may be injected into the space between the capacitor device and the anode lead frame to prevent contact therebetween.

The resin shielding part may be applied onto one entire surface or one surface of the case through which the anode lead wire is exposed.

According to another aspect of the present invention, there is provided a solid capacitor including: a capacitor device having an anode element connected to an anode lead wire, a dielectric layer provided on the surface of the anode element, an electrolyte layer laminated thereon, and a cathode layer applied onto the outside of the electrolyte layer; a case molding the capacitor device and exposing the anode lead wire on one outer surface thereof; an anode lead frame exposed on one portion of the bottom on the outside of the case and electrically connected to the anode element of the capacitor device; a cathode lead frame exposed on the other portion of the bottom on the outside of the case and electrically connected to the cathode layer of the capacitor device; a reinforcement interposed in the case between the anode lead wire and the anode lead frame to support the capacitor device and electrically connecting the anode lead wire and the anode lead frame to each other; and a resin shielding part applied onto the exposed portion of the anode lead wire to prevent the infiltration of foreign substances through the anode lead wire.

A molding material may be injected into the space between the capacitor device and the anode lead frame to prevent contact therebetween.

According to another aspect of the present invention, there is provided a method of manufacturing a solid capacitor, the method including: providing a capacitor device having an anode element connected to an anode lead wire, a dielectric layer and an electrolyte layer laminated on the anode element, and a cathode layer formed on the outside of the electrolyte layer; electrically connecting the anode element of the capacitor device and an anode lead frame through a weld reinforcement supporting the capacitor device, and electrically connecting the cathode layer of the capacitor device and a cathode lead frame through a conductive paste; manufacturing a case by molding to form the outer appearance while the anode lead wire is exposed on one outer surface thereof and the anode and cathode lead frames are exposed below the bottom surface thereof; and applying a resin material on one surface of the case through which the anode lead wire is exposed to prevent the infiltration of foreign substances.

The resin material may be applied onto one entire surface or one surface of the case through which the anode lead wire is exposed.

A molding material may be injected into a space between the capacitor device and the anode lead frame to prevent contact therebetween.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
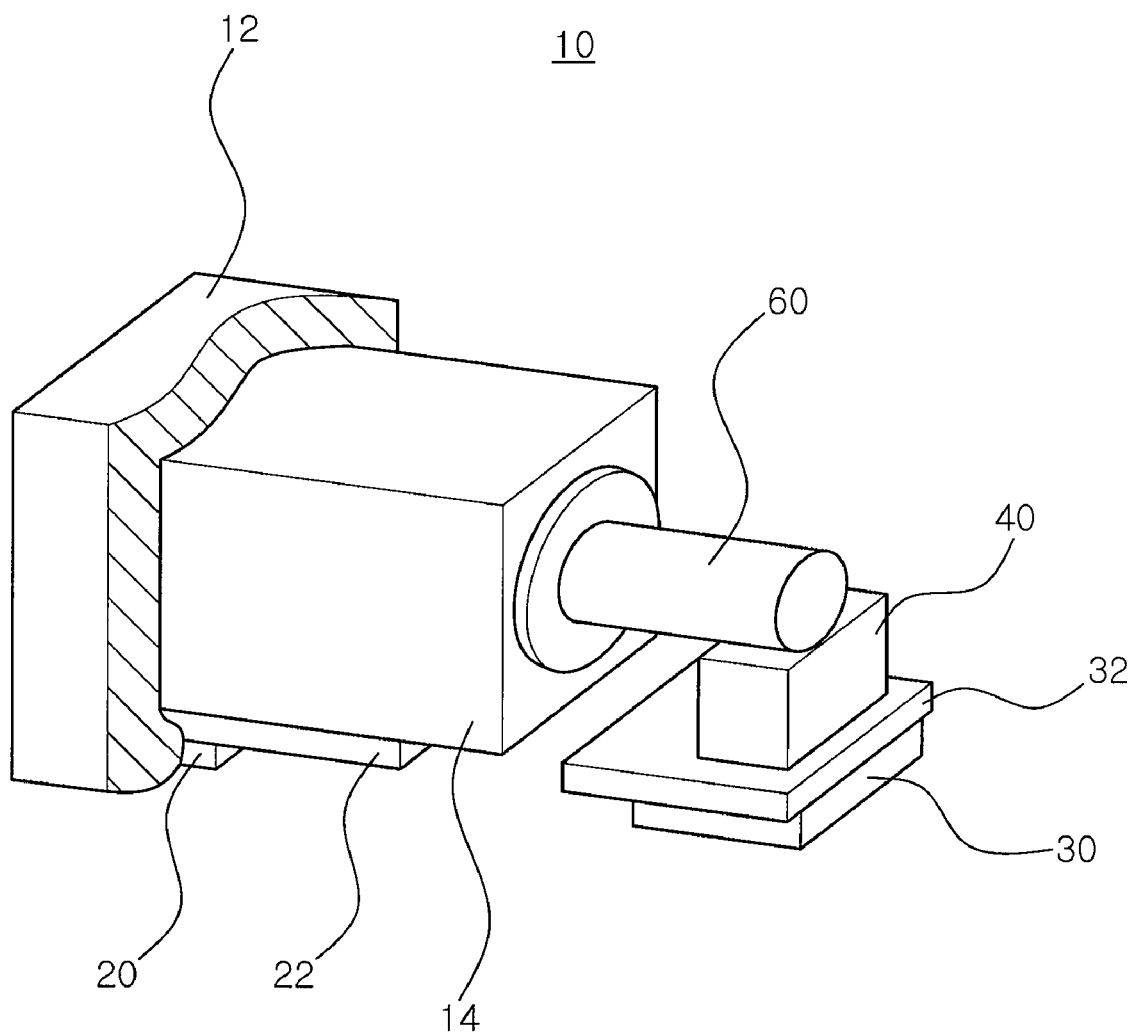
FIG. 1 is a partially exploded view illustrating the internal structure of a solid capacitor according to an exemplary embodiment of the present invention.

Exemplary embodiments of the present invention will now be described in detail with reference to the accompanying drawings. The invention may, however, be embodied in many different forms and should not be construed as limited to the embodiments set forth herein. Those skilled in the art will understand that various additions, alterations and deletions may be made without departing from the intended spirit and scope of the invention and easily propose other exemplary embodiments falling within the spirit of the invention or another invention. Accordingly, it is intended that all such additions, alterations and deletions be included within the scope of the following claims and/or the equivalents thereof.

In the drawings, the shapes and dimensions may be exaggerated for clarity, and the same reference numerals will be used throughout to designate the same or like components.

Figure 2:
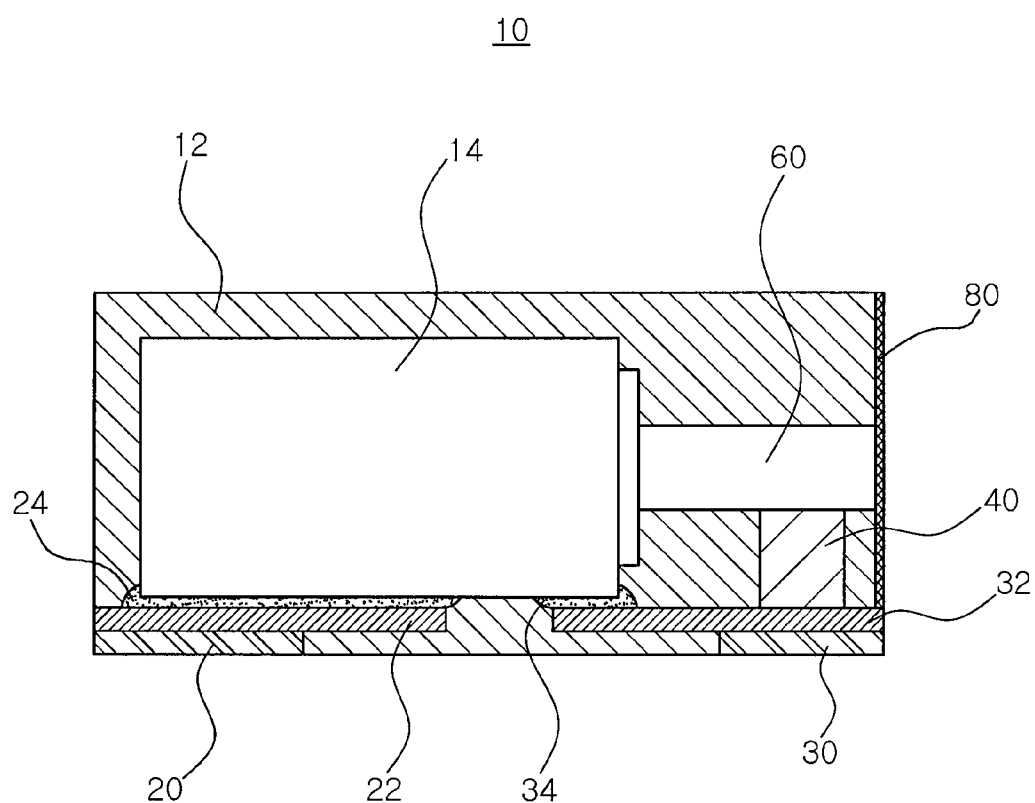
FIG. 2 is a schematic cross-sectional view illustrating a solid capacitor according to an exemplary embodiment of the present invention.

FIG. 1 is a partially exploded view illustrating the internal structure of a solid capacitor according to an exemplary embodiment of the invention. FIG. 2 is a schematic cross-sectional view illustrating a solid capacitor according to an exemplary embodiment of the invention.

Referring to FIGS. 1 and 2, a solid capacitor 10 according to this embodiment may include a capacitor device 14, a case 12, cathode and anode lead frames 20 and 30, a reinforcement 40 and a resin shielding part 80.

An anode lead wire 60 extends from one side of the capacitor device 14 and is exposed on the outside of the case 12. The capacitor device 14 may include an anode element connecting to the anode lead wire 60, a dielectric layer formed of a tantalum oxide $Ta_2O_5$ formed on the surface of the anode element, an electrolyte layer formed of manganese dioxide $MnO_2$ laminated thereon, and a cathode layer applied onto the outside of the electrolyte layer. The cathode layer may be a silver (Ag) coating layer.

The cathode lead frame 20 located under the capacitor device 14 is electrically connected to the cathode layer of the capacitor device 14 using a conductive paste 24. The cathode lead frame 20 is coupled with a first fixing member 22 having conductivity and may be connected to the capacitor device 14 by applying the conductive paste 24 over the upper surface of the first fixing member 22. The first fixing member 22 and the cathode lead frame 20 may form a single body.

The conductive paste 24 may be any one of Ag, Au, Pd, Ni and Cu having viscosity, and is cured at a temperature ranging from 30° C. to 300° C. so as to be bonded to the capacitor device.

The anode lead frame 30 of the capacitor device 14 may be electrically connected to the anode element of the capacitor device 14. The anode lead frame 30 is not directly connected to the capacitor device 14 but is electrically connected to the anode lead wire 60 extending from one side of the capacitor device 14 through the reinforcement 40. Since the reinforcement 40 is bonded to each of the anode lead wire 60 and the anode lead frame 30 by welding, the reinforcement 40 may be a weld reinforcement 40.

A conductive second fixing member 32 may be interposed between the reinforcement 40 and the anode lead frame 30. The second fixing member 32 and the anode lead frame 30 may form a single body.

A molding material 34 may fill the space between the capacitor device 14 and the anode lead frame 30 so as to prevent contact therebetween.

The molding material 34 can prevent a short circuit caused by contact between the capacitor device 14 and the anode lead frame 30.

The case 12 is provided by molding the capacitor device 14 and the cathode and anode lead frames 20 and 30, thereby forming the outer appearance of the solid capacitor.

For the miniaturization and high performance of the capacitor device 14, the capacitor device 14 increases in size, and thus the anode lead wire 60 decreases in length. The shortening of the anode lead wire 60 causes the infiltration of foreign substances, especially, moisture, thus causing failures. Therefore, the length of the anode lead wire 60 is determined so as not to adversely affect the capacitor device 14. After molding the capacitor device 14 by the case, the case 12 and the anode lead wire 60 are diced according to specifications. As a result, the anode lead wire 60 is exposed on the outside of the case 12.

The resin shielding part 80 prevents the infiltration of foreign substances through the anode lead wire 60. The resin shielding part 80 completely prevents moisture infiltration by applying epoxy paint or waterproof paint to the exposed surface of the anode lead wire 60.

Figure 3:
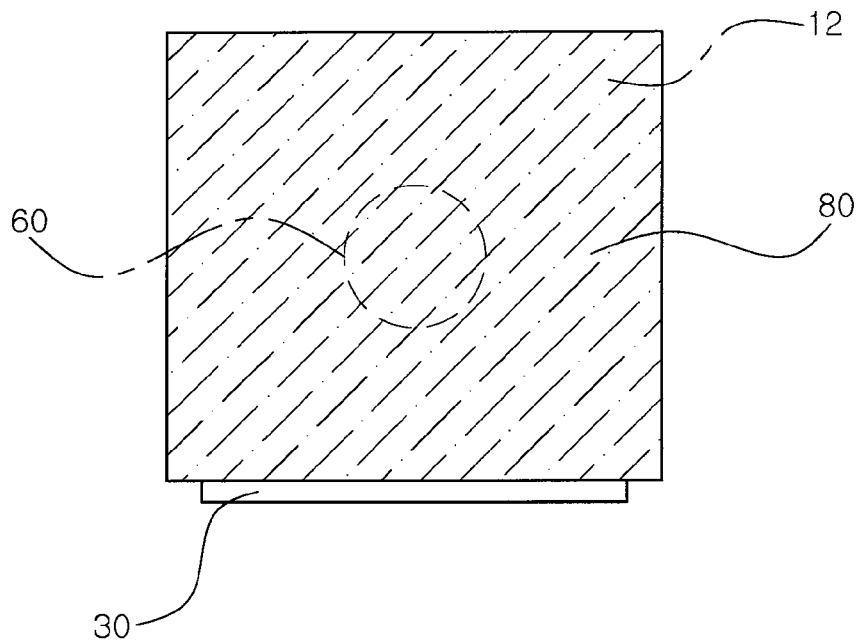
FIG. 3 is a schematic side view illustrating a solid capacitor according to an exemplary embodiment of the present invention.
Figure 4:
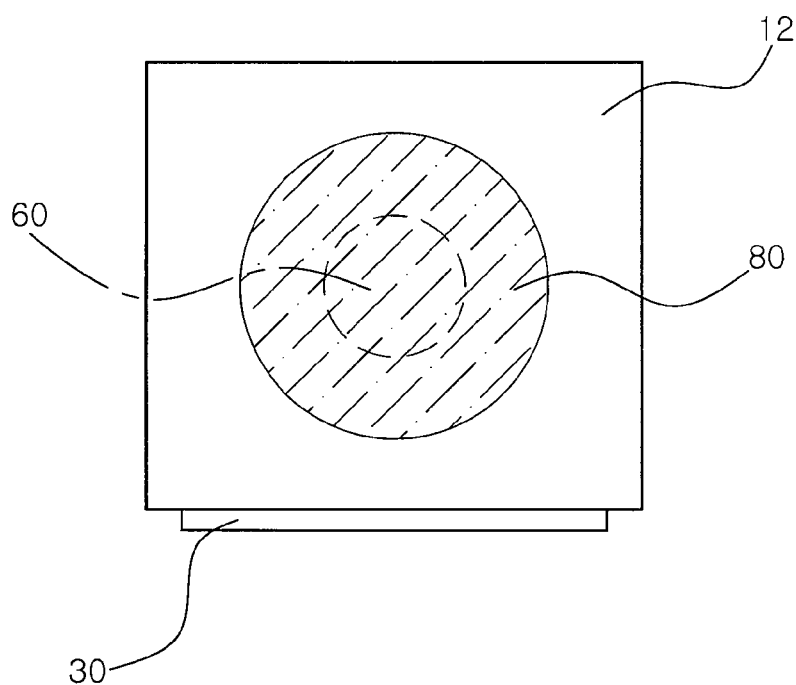
FIG. 4 is a schematic side view illustrating a solid capacitor according to another exemplary embodiment of the present invention.

FIG. 3 is a schematic side view illustrating a solid capacitor according to an exemplary embodiment of the invention. FIG. 4 is a schematic side view illustrating a solid capacitor according to another exemplary embodiment of the invention.

In FIG. 3, the resin shielding part 80 is formed on one entire surface of the case 12 to which the anode lead wire 60 is exposed. In FIG. 4, the resin shielding part 80 is formed on a portion of one surface of the case 12.

FIGS. 5 through 9 are schematic views illustrating how a solid capacitor is manufactured according to an exemplary embodiment of the invention. Hereinafter, a method of manufacturing a solid capacitor will be described with reference to FIGS. 5 through 9.

Figure 5:
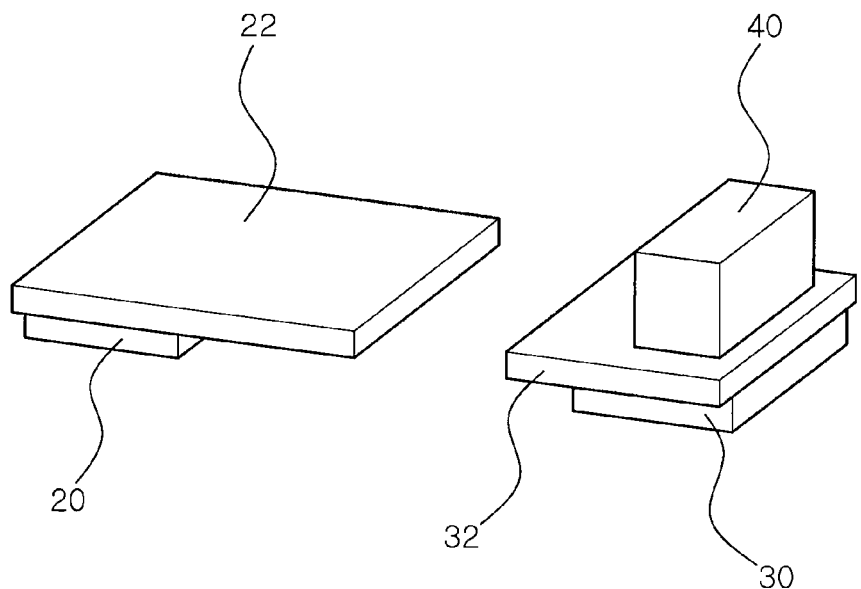
FIGS. 5 through 9 are schematic views illustrating how a solid capacitor is manufactured according to an exemplary embodiment of the present invention.
Figure 6:
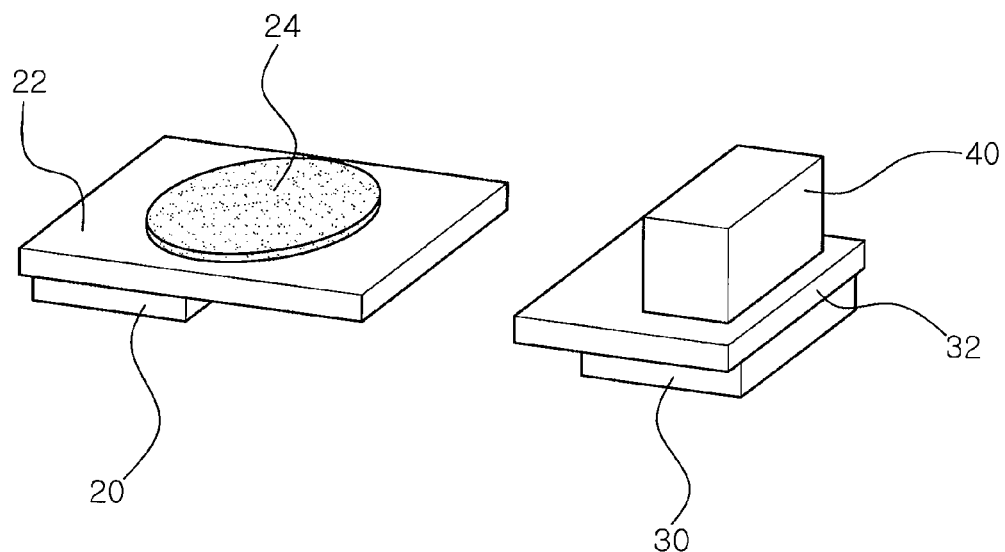

Referring to FIGS. 5 and 6, the cathode lead frame 20 and the anode lead frame 30 are prepared, the conductive paste 24 is applied onto the conductive first fixing member 22 on the cathode lead frame 20, and the weld reinforcement 40 is arranged on the second fixing member 32 of the anode lead frame 30.

The first fixing members 22 and the second fixing member 32 of the anode and cathode lead frames 20 and 30, respectively, may be formed integrally with the anode and cathode lead frames 20 and 30, respectively.

Figure 7:
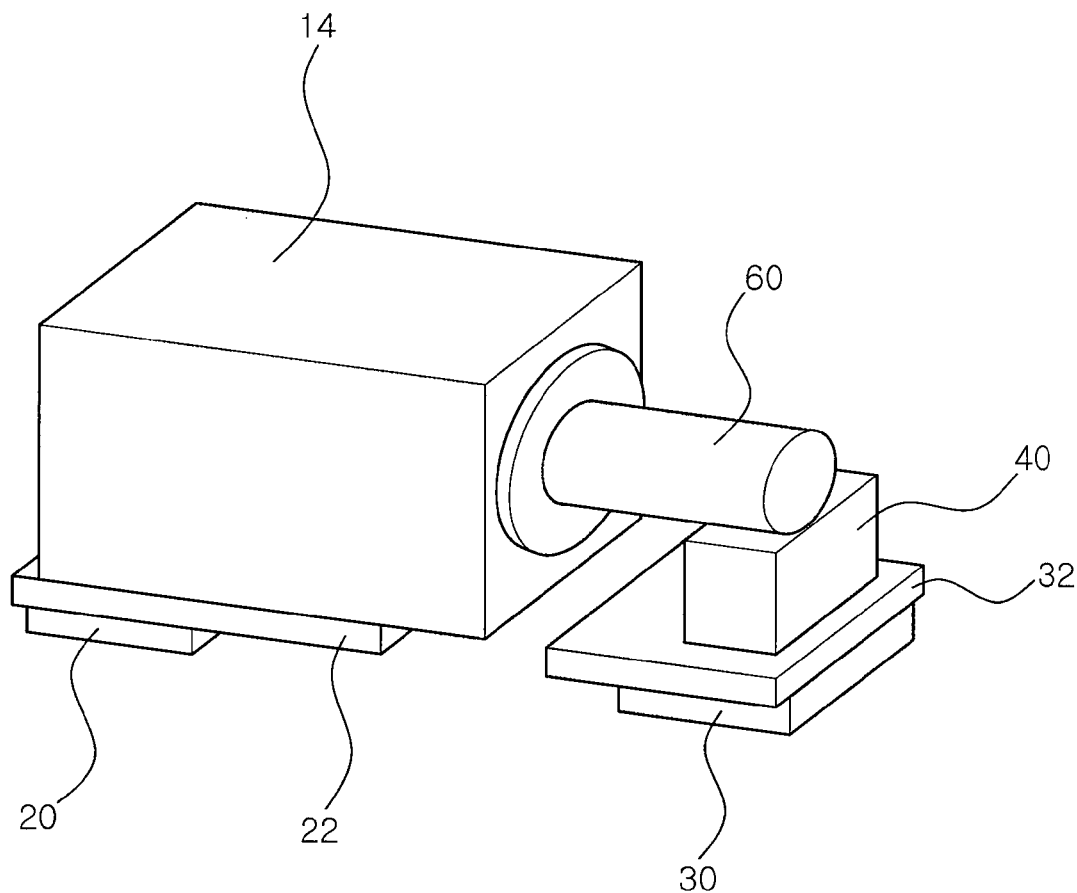

When the cathode and anode lead frames 20 and 30 are arranged as shown in FIG. 6, the capacitor device 14 is arranged on and electrically connected to the cathode and anode lead frames 20 and 30 (FIG. 7). Here, the capacitor device 14 has the anode element connecting to the anode lead wire 60, the dielectric layer and the electrolyte layer laminated on the anode element, and the cathode layer covering the outside of the electrolyte layer.

The anode element of the capacitor device 14 and the anode lead frame 30 are electrically connected to each other through the weld reinforcement 40 that supports the capacitor device 14. The cathode layer of the capacitor device 14 and the cathode lead frame 20 are electrically connected to each other through the conductive paste 24.

The anode lead wire 60 is electrically connected to the weld reinforcement 40 by spot welding.

Figure 8:
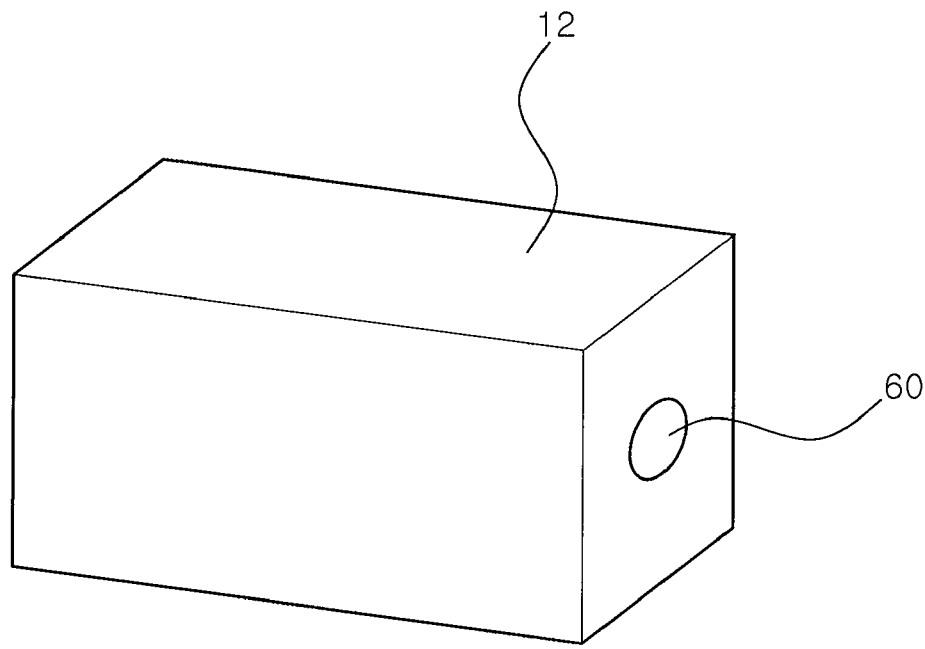

As shown in FIG. 8, the case 12 is manufactured by molding to form the outer appearance such that the anode lead wire 60 is exposed on one outer surface of the case 12 and the anode and cathode lead frames 20 and 30 are exposed below the bottom thereof.

Here, the length of the anode lead wire 60 is determined so as not to adversely affect the capacitor device 14. After manufacturing the case 12 by molding, the case 12 and the anode lead wire 60 are diced according to specifications. As a result, the anode lead wire 60 is exposed on the outside of the case 12.

Figure 9:
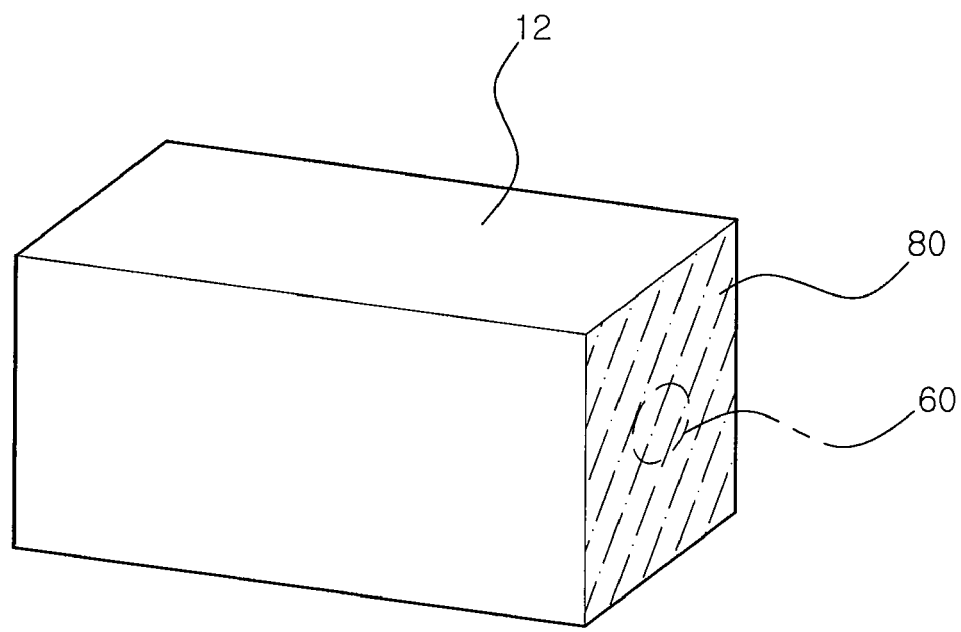

Then, as shown in FIG. 9, a resin material is applied onto one surface of the case 12 through which the anode lead wire 60 is exposed, thereby preventing the ingress of foreign substances. Here, the resin material is applied onto one entire surface or one surface of the case 12 through which the anode lead wire 60 is exposed.

The molding material 34 (see FIG. 2) may fill the space between the capacitor device 14 and the anode lead frame 30 so as to prevent contact therebetween, thereby preventing a short circuit caused by contact between the capacitor device 14 and the anode lead frame 30.

As set forth above, according to exemplary embodiments of the invention, a solid capacitor and a method of manufacturing the same can prevent moisture penetration using an anode lead wire exposed on the outside of a case.

Furthermore, a structure for preventing moisture penetration can reduce the length of the anode lead wire, thereby achieving the maximum volumetric efficiency of a solid capacitor chip of the same size.

In addition, a weld reinforcement is used to electrically connect the anode lead wire and the anode lead frame, thereby preventing a short circuit caused by direct contact between the capacitor device and the anode lead frame.

Further, a contact prevention molding part is further injected into the space between the capacitor device and the anode lead frame that is formed by the weld reinforcement, thereby preventing a short circuit more reliably, caused by direct contact between the capacitor device and the anode lead frame.

While the present invention has been shown and described in connection with the exemplary embodiments, it will be apparent to those skilled in the art that modifications and variations can be made without departing from the spirit and scope of the invention as defined by the appended claims.

What is claimed is:

1. A solid capacitor comprising:
a capacitor device having an anode lead wire extending from one side thereof;
a case molding the capacitor device and exposing the anode lead wire to the outside thereof;
cathode and anode lead frames exposed on the outside of the case and electrically connected to the capacitor device;
a reinforcement interposed in the case between the anode lead wire and the anode lead frame so as to support the capacitor device and electrically connecting the anode lead wire and the anode lead frame;
a resin shielding part applied onto the exposed portion of the anode lead wire to prevent the infiltration of foreign substances through the anode lead wire;
a first fixing member interposed between the cathode lead frame and the capacitor device to electrically connect the cathode lead frame and the capacitor device;
and a second fixing member interposed between the anode lead frame and the reinforcement to electrically connect the anode lead frame and the reinforcement.

2. The solid capacitor of claim 1, wherein the cathode lead frame is electrically connected to the capacitor device through a conductive paste.

3. The solid capacitor of claim 2, wherein the conductive paste is any one of Ag, Au, Pd, Ni and Cu having viscosity.

4. The solid capacitor of claim 1, wherein a molding material is injected into the space between the capacitor device and the anode lead frame to prevent contact therebetween.

5. The solid capacitor of claim 1, wherein the resin shielding part is applied onto one entire surface or one surface of the case through which the anode lead wire is exposed.

6. A solid capacitor comprising:
a capacitor device having an anode element connected to an anode lead wire, a dielectric layer provided on the surface of the anode element, an electrolyte layer laminated thereon, and a cathode layer applied onto the outside of the electrolyte layer;
a case molding the capacitor device and exposing the anode lead wire on one outer surface thereof;
an anode lead frame exposed on one portion of the bottom on the outside of the case and electrically connected to the anode element of the capacitor device;
a cathode lead frame exposed on the other portion of the bottom on the outside of the case and electrically connected to the cathode layer of the capacitor device;
a reinforcement interposed in the case between the anode lead wire and the anode lead frame to support the capacitor device and electrically connecting the anode lead wire and the anode lead frame to each other;
a resin shielding part applied onto the exposed portion of the anode lead wire to prevent the infiltration of foreign substances through the anode lead wire; and
a first fixing member interposed between the cathode lead frame and the capacitor device to electrically connect the cathode lead frame and the capacitor device;
and a second fixing member interposed between the anode lead frame and the reinforcement to electrically connect the anode lead frame and the reinforcement.

7. The solid capacitor of claim 6, wherein a molding material is injected into the space between the capacitor device and the anode lead frame to prevent contact therebetween.

* * * * *